(12) United States Patent
Kameo et al.

(10) Patent No.: US 8,192,781 B2
(45) Date of Patent: Jun. 5, 2012

(54) FAT COMPOSITION FOR BAKERY PRODUCT AND BAKERY PRODUCT

(75) Inventors: Yoji Kameo, Tokyo (JP); Yoshihide Asabu, Tokyo (JP); Tatsuya Tokunaga, Tokyo (JP); Shinichi Ogiwara, Tokyo (JP)

(73) Assignee: Kao Corporation, Tokyo (JP)

( * ) Notice: Subject to any disclaimer, the term of this patent is extended or adjusted under 35 U.S.C. 154(b) by 1249 days.

(21) Appl. No.: 10/560,172

(22) PCT Filed: Jun. 10, 2004

(86) PCT No.: PCT/JP2004/008488
§ 371 (c)(1),
(2), (4) Date: Nov. 30, 2006

(87) PCT Pub. No.: WO2004/110160
PCT Pub. Date: Dec. 23, 2004

(65) Prior Publication Data
US 2007/0059425 A1    Mar. 15, 2007

(30) Foreign Application Priority Data

Jun. 11, 2003 (JP) ................. 2003-166021
Dec. 19, 2003 (JP) ................. 2003-423142
Dec. 25, 2003 (JP) ................. 2003-430399
Feb. 27, 2004 (JP) ................. 2004-054699

(51) Int. Cl.
*A23D 9/013* (2006.01)
*A21D 13/00* (2006.01)
*A21D 2/16* (2006.01)

(52) U.S. Cl. ........ 426/601; 426/606; 426/653; 426/549; 426/553

(58) Field of Classification Search .................... 426/601
See application file for complete search history.

(56) References Cited

U.S. PATENT DOCUMENTS

| | | | | |
|---|---|---|---|---|
| 3,034,898 A | * | 5/1962 | Kuhrt et al. | 426/532 |
| 3,622,345 A | * | 11/1971 | Gupta | 426/555 |
| 3,806,604 A | * | 4/1974 | Kozak | 426/62 |
| 4,035,519 A | * | 7/1977 | Abou-Guendia | 426/653 |
| 4,229,480 A | * | 10/1980 | Suggs et al. | 426/24 |
| 4,242,366 A | * | 12/1980 | Morgan et al. | 426/554 |
| 4,310,556 A | * | 1/1982 | Suggs et al. | 426/96 |
| 4,310,557 A | * | 1/1982 | Suggs et al. | 426/96 |
| 4,456,626 A | * | 6/1984 | Nelson et al. | 426/553 |
| 5,658,609 A | * | 8/1997 | Abboud et al. | 426/609 |
| 6,919,098 B2 | * | 7/2005 | Ratka et al. | 426/128 |

FOREIGN PATENT DOCUMENTS

| | | |
|---|---|---|
| EP | 1 658 775 | 5/2006 |
| GB | 2 388 008 A | 11/2003 |
| JP | 58-183030 | 10/1983 |
| JP | 60-160833 | 8/1985 |
| JP | 63-71133 | 3/1988 |
| JP | 63-071133 | 3/1988 |
| JP | 63-248333 | 10/1988 |
| JP | 64-63337 | 3/1989 |
| JP | 1-257422 | 10/1989 |
| JP | 2-171136 | 7/1990 |
| JP | 3-247230 | 11/1991 |
| JP | 3-292848 | 12/1991 |
| JP | 6-22690 | 2/1994 |
| JP | 6-217692 | 8/1994 |
| JP | 6-217693 | 8/1994 |
| JP | 6-276919 | 10/1994 |
| JP | 8-266211 | 10/1996 |
| JP | 2002-191288 | 7/2002 |
| JP | 2002-291396 | 10/2002 |
| JP | 3540313 | 4/2004 |
| JP | 2005-237341 | 9/2005 |
| JP | 4118825 | 5/2008 |
| WO | 2004/110160 | 12/2004 |

OTHER PUBLICATIONS

English Translation of Kawasaki JP-1996266211, Oct. 2009.*
Turning the Heat Up on Crisco (and Lard), accessed Oct. 2009.*
Johnson, A. H. 1974. Encyclopedia of Food Technology, vol. 2. The AVI Publishing Company, Inc. Westport, CT. p. 365-369.*
Swern, D. 1979. Bailey's Industrial Oil and Fat Products, vol. 1, $4^{th}$ edition. John Wiley & Sons, New York. p. 194, 195, 416, 417.*
Kuhrt, N. H. 1963. JAOCS 40:725.*
Kuhrt, N. H. 1963. JAOCS 40:730.*
U.S. Appl. No. 11/719,896, filed May 22, 2007, Kameo, et al.
U.S. Appl. No. 11/911,070, filed Oct. 9, 2007, Kameo, et al.
European Search Report issued Aug. 10, 2010 in 10167479.4 filed Jun. 10, 2004.
Office Action mailed on Jan. 25, 2011, in Japanese Patent Application 2010-094614 (with english translation). Office Action mailed on Jan. 25, 2011, in Japanese Patent Application 2010-094612 (with english translation).
Office Action mailed on Mar. 29, 2011, in Japanese Patent Application 2010-094614 (with english translation).
Office Action mailed on Mar. 29, 2011, in Japanese Patent Application 2010-094612 (with english translation).

* cited by examiner

*Primary Examiner* — Carolyn Paden
(74) *Attorney, Agent, or Firm* — Oblon, Spivak, McClelland, Maier & Neustadt, L.L.P.

(57) ABSTRACT

The invention provides a fat and oil composition for bakery products, which contains 50 to 85 parts by weight of (A) edible fat and oil wherein the content of unsaturated fatty acid residues in the total constituent fatty acids thereof is 75 wt % or more, 10 to 35 parts by weight of (B) an emulsifier, and 0.1 to 10 parts by weight of (C) a humectant, wherein the (A)/(B) ratio by weight is 6.5 or less, as well as a bakery product compounded with the fat and oil composition for bakery products. The invention also provides use of the fat and oil composition in producing bakery products and a method of producing a bakery product by adding the fat and oil composition to dough.

25 Claims, No Drawings

FAT COMPOSITION FOR BAKERY PRODUCT AND BAKERY PRODUCT

CROSS REFERENCES TO RELATED APPLICATIONS

This application is a 371 of International Patent Application No. PCT/JP04/08488, filed on Jun. 10, 2004, and claims priority to Japanese Patent Application No. 2003-166021, filed on Jun. 11, 2003, Japanese Patent Application No. 2003-423142, filed on Dec. 19, 2003, Japanese Patent Application No. 2003-430399, filed on Dec. 25, 2003, and Japanese Patent Application No. 2004-054699, filed on Feb. 27, 2004.

FIELD OF THE INVENTION

The present invention relates to a fat and oil composition for bakery products and a bakery product using the same, specifically bread, cake, and frozen dough for bread.

BACKGROUND OF THE INVENTION

For bakery products, particularly bread, prevention of staleness of the products during storage has been attempted, and addition of an emulsifier and a thickener made of polysaccharides has been examined.

Conventionally, various techniques of preventing the staleness of bakery products by only the emulsifier have been proposed. However, when only the emulsifier is used to exhibit an staleness-preventing effect, the emulsifier should be added in a large amount. As a result, a certain staleness-preventing effect can be obtained, but because there is excess flavor, etc. of the emulsifier itself added in excess, the flavor and feel when eating of the resulting bread are not excellent.

As conventional techniques of using a thickener made of polysaccharides, there have been proposed techniques of using a thickener by dispersing it in a powdery form in wheat flour, etc. (JP-A 63-248333, JP-A 1-257422, JP-A 2002-291396) and techniques of using a composition having a natural gum substance and glycerin fatty ester compounded in a predetermined ratio (JP-A 63-71133), techniques of using a composition containing gum substance/starch substance/protein to which edible fats and oils are partially added (JP-A 60-160833).

To solve the problem described above, on the other hand, there are proposed techniques of dispersing a thickener in a fat and oil composition containing a water-in-oil emulsified composition (JP-A 58-183030, JP-A 64-63337, JP-A 2-171136, JP-A 6-22690).

SUMMARY OF THE INVENTION

The present invention provides a fat and oil composition for bakery products, which contains 50 to 85 parts by weight of (A) edible fat and oil wherein the content of unsaturated fatty acid residues in the total constituent fatty acids thereof is 75 wt % or more, 10 to 35 parts by weight of (B) an emulsifier, and 0.1 to 10 parts by weight of (C) a humectant, wherein the (A)/(B) ratio by weight is 6.5 or less.

The present invention also provides a bakery product containing the fat and oil composition for bakery products compounded therewith.

Further, the present invention provides use of the fat and oil composition in producing bakery products, as well as a method of producing a bakery product by adding the fat and oil composition to dough.

DETAILED DESCRIPTION OF THE INVENTION

In JP-A63-248333, JP-A 1-257422, JP-A2002-291396, JP-A 63-71133 and JP-A 60-160833 supra, the thickener itself absorbs water and aggregates during preparation of bread dough to decrease the efficiency of dispersion, thus failing to exhibit its staleness-preventing effect and further hardly attaining good feel when eating sometimes due to aggregation of the thickener.

In JP-A 58-183030, JP-A 64-63337, JP-A 2-171136 and JP-A 6-22690, the fat and oil composition cannot prevent the thickener from contacting with water because of the presence of an aqueous phase in the composition, and is thus not satisfactory for exhibiting an effect of preventing aggregation of the thickener.

In the fat and oil (A) used in the present invention, unsaturated fatty acid residues account for 75% or more of the total constituent fatty acid residues thereof. The fat and oil (A) is preferably a liquid oil wherein unsaturated fatty acid residues account for 80% or more, and the liquid oil is particularly preferably one having a melting point of 20° C. or less, particularly 10° C. or less. In particular, rape oil, corn oil and soybean oil are preferable. Fatty acids constituting the unsaturated fatty acid residues include C12 to C22, more preferably C16 to C22, fatty acids, and specific examples include palmitoleic acid, oleic acid, linoleic acid, linolenic acid, gadoleic acid, eicosadienoic acid, erucic acid, docosadienic acid etc. As the liquid oil, diacyl glycerol and middle-chain fatty acid-containing triglyceride and diglyceride can also be used insofar as they satisfy the fatty acid-constituting conditions described above. The amount of the edible fat and oil (A) incorporated is preferably 50 to 85 parts by weight, more preferably 70 to 80 parts by weight.

The emulsifier (B) used in the present invention includes glycerin fatty esters, sucrose fatty esters, sorbitan fatty esters, polysorbates, propylene glycol fatty esters, lecithin and lecithin derivatives, and these materials are used as a mixture of two or more thereof. The amount of (B) incorporated is suitably 10 to 35 parts by weight, preferably 10 to 30 parts by weight, more preferably 14 to 26 parts by weight, while satisfying a (A)/(B) ratio of 6.5 or less.

Incorporation of the emulsifier in the present invention brings about the following effects: (1) the humectant in a powdery state can be dispersed in a fixed state in the edible fat and oil mainly in the form of liquid oil, and (2) staleness is inhibited by the emulsifier itself. The humectant does not aggregate particularly due to the effect in (1), and can thus be incorporated into bread and cake to bring about an effect of improving feel when eating, particularly an effect of improving a moist feel and dissolving feel in the mouth.

As the emulsifier (B), glycerin fatty esters and propylene glycol fatty esters are preferable from the viewpoint of the above-mentioned (1). The glycerin fatty esters in the present invention are esters between glycerin and fatty acid or derivatives thereof, and refer to glycerin fatty monoester (usually monoglyceride), glycerin fatty diester, glycerin organic fatty monoester, polyglycerin fatty monoester, polyglycerin condensed linoleic ester, etc. The propylene glycol fatty esters in the present invention are esters between propylene glycol and fatty acid, and used in the form of monoester or diester. In particular, the glycerin fatty monoester and propylene glycol fatty monoester are preferable, and these are more preferably simultaneously used from the viewpoint of the above-mentioned (1). That is, the total of the glycerin fatty monoester and propylene glycol fatty monoester in the emulsifier is 80 wt % or more, and the glycerin fatty ester/propylene glycol fatty monoester=1/0.5 to 2.0, preferably a ratio of almost 1/1, and the edible fat and oil (A)/emulsifier (B) ratio is 6.5 or less (value obtained by dividing the amount of the incorporated edible fat and oil by the amount of the incorporated emulsifier), preferably 1.7 to 6.5, more preferably 2.0 to 6.5, still more preferably 3.0 to 6.5, from the viewpoint of the dispersibility of the component (C).

The emulsifier (B) is preferably a mixture of glycerin fatty monoester and propylene glycol fatty monoester, wherein the glycerin fatty monoester/propylene glycol fatty monoester ratio by weight is preferably 1/0.5 to 1/2.

That is, the edible fat and oil (A) mainly in the form of liquid oil can be hardened to a state without mobility, and the humectant dispersed in a powdery state in the same edible fat and oil can be dispersed uniformly in a fixed state without precipitation.

When the edible fat and oil/emulsifier ((A)/(B)) ratio is higher than 6.5, the fat and oil composition itself becomes viscous and mobile, and powder in the composition is precipitated and the liquid oil in the edible fat and oil is separated so that the composition is not in a uniform state, thus failing to exhibit good performance. In the present invention, the degree of penetration can be defined as a measure indicative of the hardened state of the edible fat and oil losing mobility.

According to the measurement of the degree of penetration described in ASTM-D217 ("ASTM Penetration Measurement Method", D217 in the Annual Book of Standards 1994, Section 5, Volume 05.01), the degree of penetration is a value measured in the following manner. That is, the fat and oil composition is packed in a container of length 115 mm×width 115 mm×depth 90 mm, and its surface is flattened. The sample is left at measurement temperature (20° C.) for 30 minutes, and then a needle (penetrometer cone) equipped with an 102.5 g conical loading is contacted with the surface of the sample, and after 5 seconds, the distance by which the needled penetrated is indicated in the unit of 0.1 mm. A smaller degree of penetration is indicative of higher hardness of a sample measured. In the present invention, the degree of penetration is 200 or less, more preferably 100 or less, in order that the edible fat and oil are in a hardened state without mobility.

The glycerin fatty monoester is also effective from the viewpoint of the above-mentioned (2). For exhibiting the staleness-preventing effect, the glycerin fatty monoester is compounded in an amount of preferably 5 to 20 parts by weight, more preferably 7 to 15 parts by weight.

From the viewpoint of the above-mentioned (1), the propylene glycol fatty monoester is compounded in an amount of preferably 5 to 20 parts by weight, more preferably 7 to 15 parts by weight.

The fatty acid as a constituent component of the glycerin fatty ester and propylene glycol fatty ester in the present invention includes C12 to C22 saturated or unsaturated fatty acids such as lauric acid, myristic acid, palmitic acid, stearic acid, oleic acid, behenic acid etc., among which the saturated fatty acids are particularly preferable, and C14 to C22 saturated fatty acids are more preferable. The ester may be constituted from one of these fatty acids, but may be a mixture constituted from two or more fatty acids.

As another usable emulsifier, the glycerin organic fatty monoester mentioned in one form of the glycerin fatty ester is a compound wherein an OH group in position 3 of the glycerin fatty monoester has been esterified with an organic acid. The organic acid includes aliphatic monocarboxylic acids constituted of lower fatty acids, such as acetic acid, propionic acid, butyric acid, etc., aliphatic saturated dicarboxylic acids such as oxalic acid, succinic acid, etc., aliphatic unsaturated dicarboxylic acids such as maleic acid, fumaric acid, etc., oxy acids such as lactic acid, malic acid, tartaric acid, diacetyl tartaric acid, citric acid, etc., and amino acids such as glycine, aspartic acid, etc. Particularly, citric acid, succinic acid, tartaric acid, and diacetic tartaric acid are preferable, and those having an HLB of 4 to 14 are preferable.

Commercial glycerin organic fatty esters partially contain unreacted organic acids or glycerin fatty monoesters, and such commercial glycerin organic fatty monoesters can also be used in the present invention.

Specific examples of the polyglycerin constituting the polyglycerin fatty monoester include one or more compounds selected from the group consisting of tetraglycerin, pentaglycerin, hexaglycerin, heptaglycerin, nonaglycerin and decaglycerin. Particularly, those having a glycerin's polymerization degree of 1 to 9 are preferable.

The polyglycerin condensed ricinoleic ester is an ester between polyglycerin and condensed ricinoleic acid, and usually a mixture of mono- or diesters between polyglycerin having a glycerin polymerization degree of 2 to 3 and condensed ricinoleic acid having 3 to 5 ricinoleic acid molecules condensed therein is used.

The sucrose fatty ester used in the present invention is an ester between sucrose and fatty acid, and includes mono-, di-, tri- and poly-esters, and its constituent fatty-acid is one of C12 to C24 fatty acids or a mixture of two or more of such fatty acids. Those having an HLB of 5 to 15 are preferable.

The sorbitan fatty ester used in the present invention is an ester between sorbitan and fatty acid, and its constituent fatty acid is one of C12 to C24 fatty acids or a mixture of two or more of such fatty acids. The sorbitan fatty ester includes monoesters and triesters, among which the monoesters are preferable in the present invention.

Lecithin used in the present invention is a phospholipid mixture containing phosphatidyl choline, phosphatidyl ethanolamine, phosphatidyl inositol, phosphatidic acid, etc., and its typical example is lecithin obtained from soybean, yolk or the like. The lecithin derivatives include lysolecithin, lysophosphatidic acid, etc.

The humectant (C) in the present invention includes protein, thickening polysaccharides, etc.

The humectant is added in an amount of 0.1 to 10 parts by weight and incorporated preferably in an amount of 0.5 to 5 parts by weight from the viewpoint of exhibiting the staleness-preventing effect. When the amount of the humectant added is less than 0.1 part by weight, a sufficient prevention effect of staleness cannot be attained, while when the amount is higher than 10 parts by weight, feel upon eating of the resulting bakery product is deteriorated.

The protein may be a substance showing viscosity when dissolved in water, and includes milk protein and plant protein. The milk protein includes sodium casein, calcium casein, rennet casein, milk casein, milk whey, lactalbumin, lactoglobulin, etc. The plant protein includes soybean protein, wheat protein, etc.

The thickening polysaccharides include gellan gum, karaya gum, tamarind seed gum, cod gum, glucomannan, xanthane gum, locust bean gum, pullulan, guar gum, iotacarrageenan, HM pectin, LM pectin, tragacanth gum, crystalline cellulose, PGA (propylene glycol alginate), SSHC (water-soluble soybean polysaccharide), gum ghatti, methyl cellulose, psyllium seed and cassia gum. These proteins and thickening polysaccharides may be used alone or as a mixture of two or more thereof. In respect of flavor and feel upon eating, xanthane gum, guar gum and locust bean gum are particularly preferable, and xanthane gum is more preferable.

In the fat and oil composition of the present invention, a preservative, a pH adjusting agent, a colorant, a spice, etc. may be suitably used.

In the present invention, the process for producing the fat and oil composition contains heating the components (A) and (B) at a temperature not lower than the melting points of the respective components, to melt the mixture uniformly, then adding the component (C), and stirring the mixture uniformly. The resulting uniform mixture is cooled to a temperature not higher than the melting points of the respective components, preferably to 30° C. or less, whereby the objective fat and oil composition is obtained. The rate of cooling is preferably higher. That is, when the emulsifier is crystallized by cooling, rapid cooling is more preferable than gradual cooling because coarse crystals of the emulsifier are not formed, thus improving the dispersibility of the emulsifier itself and promoting the staleness-preventing effect. In the production described above, a container itself containing the uniform mixture at high temperature may be externally cooled in order to cool the uniform mixture, but in respect of performance, it is generally preferable that the mixture is cooled rapidly with a chiller, a votator mixer, a combinator or the like used in the production of shortening or margarine.

The present invention encompasses bakery products using the fat and oil composition for bakery products. The bakery products include bread, cake, frozen bread dough, and baked cake.

The bread also includes bread stuffed with fillings, etc., and sliced bread (square or mountain-shaped), special bread, cooked bread, sweet rolls, etc. Specifically, the sliced bread includes bread with less oil, such as white bread, rye bread, cooked bread, raisin bread, French bread, soft French bread, etc., bread with a lot of oil, such as variety bread, rolls (table roll, buns, butter roll etc.), Danish pastry, brioche, croissant, and the sweet rolls with some oil, which include a sweet roll containing jam, a bean-jam bun, cream bread, raisin bread, and melon bread. Special bread includes muffins, etc., cooked bread includes bread for hot dogs, hamburgers, etc. Cake includes sponge cake, butter cake, chiffon cake, roll cake, Swiss rolls, busse, baumkuchen, pound cake, cheese cake, snack cake, steamed cake, half-baked cake, etc. Baked cake includes biscuits, cookies, etc.

The bread of the present invention is bread containing liquid oil, which contains 1 to 20 parts by weight of the fat and oil composition for bakery products according to the present invention and 0.5 to 8 parts by weight of (D) fat and oil having a melting point of 25 to 50° C. incorporated into 100 parts by weight of wheat flour. The bread is preferably bread with less oil, such as sliced bread. Further, the bread of the present invention is bread containing liquid oil, which contains 1 to 20 parts by weight of the fat and oil composition for bakery products according to the present invention, 8 to 20 parts by weight of (D) fat and oil having a melting point of 25 to 50° C., and 8 to 30 parts by weight of (E) sugar incorporated into 100 parts by weight of wheat flour. This bread is preferably bread with some oil, such as sweet rolls. The bread of the present invention is also bread containing liquid oil, which contains 1 to 20 parts by weight of the fat and oil composition for bakery products according to the present invention, 20 to 70 parts by weight of (D) fat and oil having a melting point of 25 to 50° C., and 5 to 30 parts by weight of (E) sugar incorporated into 100 parts by weight of wheat flour. This bread is preferably bread with a lot of oil, such as Danish pastry, brioche, croissant, etc. In any kind of bread, the amount of the fat and oil composition for bakery products is more preferably 3 to 10 parts by weight in order to achieve a sufficient staleness-preventing effect.

The wheat flour used in the present invention is mainly bread flour and semi-bread flour, and from the viewpoint of improving feel upon eating, all-purpose flour and weak flour are partially used. Generally, the above classification is defined by the amount of protein in the wheat flour, and the amount of protein is prescribed to be 11.5 to 13.0% in the bread flour, 10.5 to 12.5% in the semi-bread flour, 7.5 to 9.0% in the moderate-power flour, and 6.5 to 8.0% in the weak flour. The amount of starch in the wheat flour used in the present invention is 65 to 78 parts by weight, preferably 68 to 75 parts by weight, more preferably 69 to 72 parts by weight, relative to 100 parts by weight of the wheat flour.

From the viewpoint of bread production, the fat and oil (D) used in the present invention have the functions of improving an internal phase texture of bread, increasing the volume thereof and improving mechanical resistance, and fat and oil having plasticity, such as butter, lard, margarine, shortening, etc. are generally used. J. C. Baker et al. have recognized that it is a condition necessary for effective functioning that added fats and oils are in a solid state in a step of molding and fermenting bread dough. Similar to bread dough not using fats and oils, bread dough kneaded with liquid oil or with fats and oils melted at the fermentation temperature terminates expansion at an early stage in an oven, to provide bread with a small volume. A reason mentioned for this phenomenon is that the dough with liquid oil cannot retain expansion caused by water vapor, air, etc. generated at low temperatures at which gelatinization of starch and thermal solidification of gluten do not occur, and thus such water vapor, air are diffused to the outside of the dough (Science II of Bread Manufacture, Science of Bread Material [in Japanese], Korin (1992), edited by Yasuo Tanaka and Hiroshi Matsumoto/J. C. Baker, M. D. Mize, Cereal Chem., 19, 84 (1942)).

With respect to properties, the fat and oil have a melting point of preferably 25 to 50° C., more preferably 27 to 45° C., still more preferably 30 to 40° C., and are in a semisolid or solid state at room temperature are preferred. SFC (25° C.) in the fat and oil (D) is preferably 5 to 40%, more preferably 10 to 35%, still more preferably 15 to 30%.

As the fat and oil, use is made of animal and vegetable oils, their hydrogenated hardened oils (solid fats), and transesterified oils.

Specific examples of the fat and oil include animal oils such as tallow, lard and fish oil, and vegetable oils such as soybean oil, palm oil, palm kernel oil, cottonseed oil, peanut oil, rape oil, corn oil, safflower oil, sunflower oil, rice oil, etc.

It is preferable from functions and workability required at the time of the production of bread and plain flavor and shortness (tasty) as properties of bread that the amount of the fat and oil (D) incorporated into 100 parts by weight of wheat flour is 0.5 to 8 parts by weight, preferably 2 to 8 parts by weight, more preferably 4 to 6 parts by weight, in the case of bread with less oil, such as sliced bread, the amount is 8 to 20 parts by weight, preferably 8 to 18 parts by weight, more preferably 10 to 15 parts by weight, in the case of bread with some oil, such as sweet rolls, the amount is 20 to 70 parts by weight, preferably 22 to 65 parts by weight, more preferably 25 to 60 parts by weight, in the case of bread with a lot of oil, such as Danish pastry, brioche, croissant, etc.

In the production of bread, it is preferable from the viewpoint of the staleness-preventing effect that an emulsifier corresponding to the emulsifier (B) incorporated into the fat and oil composition for bakery products according to the present invention is incorporated separately into bread.

Bread with some oil, such as sweet rolls, and bread with a lot of oil, such as Danish pastry, brioche or croissant, is blended with sugar (E). As the sugar, every sugar which can be usually used in bread can be used. Specific examples include monosaccharides such as glucose, fructose, galactose etc., polysaccharides such as maltose, sucrose, maltose, starch syrup, isomerized sugar, invert sugar, cyclodextrin, branched cyclodextrin, dextrin etc., reducing sugar such as starch hydrolysates, sugar alcohols such as sorbitol, maltitol, xylitol, etc., sucralose, aspartame, acesulfame potassium, etc. can be used, and these can be used singly or as a mixture of two or more thereof.

From the viewpoint of the flavor (particularly sweetness) and tackiness of sweet rolls, the sugar (E) in the product of the present invention is incorporated in an amount of 8 to 30 parts by weight, preferably 10 to 25 parts by weight, relative to 100 parts by weight of wheat flour in bread dough for bread with some oil, such as sweet rolls. From the same viewpoint, the sugar (E) in the product of the present invention is incorporated in an amount of 5 to 30 parts by weight, preferably 10 to 25 parts by weight, relative to 100 parts by weight of wheat flour, in the case of bread with a lot of oil, such as Danish pastry, brioche or croissant.

In the present invention, the content of each component after production of bread is preferably in the following range:

The bread of the present invention is bread containing liquid oil, containing 0.5 to 17 parts by weight of (A') liquid oil having a melting point of 20° C. or less, 0.1 to 7 parts by weight of (B) an emulsifier, 0.001 to 2 parts by weight of (C) a humectant, and 0.5 to 8 parts by weight of (D) fat and oil having a melting point of 25 to 50° C., incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. The bread in this case is preferably bread with less oil, such as sliced bread. The bread of the present invention is also bread containing liquid oil, containing 0.5 to 17 parts by weight of (A') liquid oil having a melting point of 20° C. or less, 0.1 to 7 parts by weight of (B) an emulsifier, 0.001 to 2 parts by weight of (C) a humectant, 8 to 20 parts by weight of (D) fat and oil having a melting point of 25 to 50° C., and 8 to 30 parts by weight of (E) sugar, incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. The bread in this case is preferably bread with some oil, such as sweet rolls. Further, the bread of the present invention is bread containing liquid oil, containing 0.5 to 17 parts by weight of (A') liquid oil having a melting point of 20° C. or less, 0.1 to 7 parts by weight of (B) an emulsifier, 0.001 to 2 parts by weight of (C) a humectant, 20 to 70 parts by weight of (D) fat and oil having a melting point of 25 to 50° C., and 5 to 30 parts by weight of (E) sugar, incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. The bread in this case is preferably bread with a lot of oil, such as Danish pastry, brioche or croissant.

From the viewpoint of the strength of dough during production and mechanical resistance, the amount of the liquid oil (A') having a melting point of 20° C. or less is more preferably 1 to 10 parts by weight. The emulsifier (B) is preferably 0.1 to 7 parts by weight, more preferably 0.1 to 5 parts by weight, relative to 100 parts by weight of wheat flour because the humectant (C) in a powdery state can be fixed and dispersed in the liquid oil (A') without aggregation, thus improving the feel of bread or cake upon eating, particularly its moist feel and dissolving feel in the mouth, and achieving the prevention of staleness by the emulsifier itself. From the same viewpoint, the glycerin fatty ester/propylene glycol fatty monoester ratio in the emulsifier (B) is preferably almost 1/1, and the ratio of the liquid oil (A') having a melting point of 20° C. or less to the emulsifier (B) is 6.5 or less, preferably 1.7 to 6.5, more preferably 2.0 to 6.5, still more preferably 3.0 to 6.5. From the viewpoint of a sufficient staleness-preventing effect and prevention of deterioration of feel upon eating, the amount of the humectant (C) is preferably 0.001 to 2 parts by weight, more preferably 0.01 to 1 part by weight, still more preferably 0.05 to 1 part by weight, relative to 100 parts by weight of wheat flour.

The bread of the present invention is also bread containing liquid oil, containing 1 to 25 parts by weight of fat and oil, 0.1 to 7 parts by weight of (B) an emulsifier, and 0.001 to 2 parts by weight of (C) a humectant, incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. The amount of the fat and oil is preferably 3 to 18 parts by weight, more preferably 5 to 16 parts by weight. The bread in this case is preferably bread with less oil, such as sliced bread. Further, the bread of the present invention is bread containing liquid oil, containing 8.5 to 37 parts by weight of fat and oil, 0.1 to 7 parts by weight of (B) an emulsifier, 0.001 to 2 parts by weight of (C) a humectant, and 8 to 30 parts by weight of (E) sugar, incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. The content of the fat and oil is preferably 9 to 35 parts by weight, more preferably 10 to 30 parts by weight. The bread in this case is bread with some oil, such as sweet rolls. Further, the bread of the present invention is bread containing liquid oil, containing 20.5 to 87 parts by weight of fat and oil, 0.1 to 7 parts by weight of (B) an emulsifier, 0.001 to 2 parts by weight of (C) a humectant, and 8 to 30 parts by weight of (E) sugar, incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. The amount of the fat and oil is preferably 22 to 80 parts by weight, more preferably 24 to 75 parts by weight. The bread in this case is preferably bread with a lot of oil, such as Danish pastry, brioche or croissant.

With respect to the properties of the bread with less oil such as sliced bread in the present invention, the stress of the bread stored at 20° C. for 3 days after baking is 2.2 N or less upon 50% compression in the thickness direction of the bread. Specifically, the bread is cooled for 90 minutes after baking, then stored at 20° C. for 3 days, and cut in a thickness of 20 mm with a slicer, and from the center (cram portion) of the bread having a thickness of 20 mm, a bread piece having dimensions of length×width 60 mm×60 mm was cut off with a bread cutting knife, and this cut sample was further divided into 4 equal pieces, and as a result, a compression stress measurement sample having dimensions of length×width 30 mm×30 mm was obtained.

With respect to the properties of the bread with some oil such as sweet rolls in the present invention, the stress of the bread stored at 20° C. for 3 days after baking is 2.8 N or less upon 50% compression in the thickness direction of the bread. Specifically, the bread is cooled for 45 minutes after baking, then stored at 20° C. for 3 days and cut horizontally in the lengthwise direction of the bread at a portion apart by 10 mm from the bottom of the bread, and the remaining bread was further cut horizontally in the lengthwise direction of the bread at a portion apart by 20 mm in the thickness direction from the bottom of the bread. Then, from the center (cram portion) of the cut bread having a thickness of 20 mm, 3 bread pieces each having dimensions of length×width 30 mm×30 mm were cut off with a bread cutting knife, to make compression stress measurement samples.

In the measurement of compression stress, a rheometer (RHEONER:RE-33005) manufactured by Yamaden Co., Ltd. was used, and the compression stress measurement sample was measured for stress upon 50% compression in the thickness direction. The 6 measurement samples cut off from the 2 pieces of bread as described above were measured, and the average compression stress was used.

The method of producing the bread, particularly sliced bread and sweet rolls, includes a straight method (straight dough method), a sponge-dough method, a poolish process, a hot-water poolish process, etc.

The present invention provides frozen bread dough formed by incorporating 1 to 20 parts by weight of the fat and oil composition for bakery products according to the present invention into 100 parts by weight of wheat flour. The fat and oil composition for bakery products according to the present invention is incorporated preferably in an amount of 3 to 10 parts by weight relative to 100 parts by weight of wheat flour in order to achieve a sufficient staleness-preventing effect, moist feel and dissolving feel in the mouth and to achieve the prevention of staleness by the emulsifier itself. From the viewpoint of operativeness in bread production and bread flavor, the fat and oil (D) having a melting point of 25 to 50° C. are incorporated in an amount of preferably 0.5 to 50 parts by weight, more preferably 2.5 to 43 parts by weight, still more preferably 4.5 to 38 parts by weight, relative to 100 parts by weight of wheat flour in the frozen bread dough of the present invention.

The frozen bread dough of the present invention is preferably frozen bread dough containing 1 to 67 parts by weight of fat and oil, 0.1 to 7 parts by weight of (B) an emulsifier, and 0.001 to 5 parts by weight of (C) a humectant, incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. In this case, the content of the fat and oil is preferably 3 to 60 parts by weight, more preferably 5 to 55 parts by weight.

Also, the frozen bread dough of the present invention is preferably frozen bread dough containing 0.5 to 17 parts by weight of (A') liquid oil having a melting point of 20° C. or less, 0.1 to 7 parts by weight of (B) an emulsifier, 0.001 to 2 parts by weight of (C) a humectant, and 0.5 to 50 parts by weight of (D) fat and oil having a melting point of 25 to 50° C., incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2. In this case, the content of the liquid oil (A') having a melting point of 20° C. or less is preferably 1 to 10 parts by weight, from the viewpoint of dough strength and mechanical resistance.

Preferably, the frozen bread dough of the present invention is compounded with yeast (F). The yeast (F) incorporated is preferably generally commercially available yeast for frozen dough. The yeast (F) is incorporated in an amount of preferably 3 to 30 parts by weight, more preferably 5 to 25 parts by weight, relative to 100 parts by weight of wheat flour, from the viewpoint of bread volume and bread flavor.

In the present invention, the frozen dough described above can be baked to make bread. The bread obtained by baking the frozen dough can be bread containing 1 to 67 parts by weight of fat and oil, 0.1 to 7 parts by weight of (B) an emulsifier, and 0.001 to 2 parts by weight of (C) a humectant, incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2.

The bread obtained by baking the frozen dough described above can be bread containing 0.5 to 17 parts by weight of (A') liquid oil having a melting point of 20° C. or less, 0.1 to 7 parts by weight of (B) an emulsifier, 0.001 to 2 parts by weight of (C) a humectant, and 0.5 to 50 parts by weight of (D) fat and oil having a melting point of 25 to 50° C., incorporated into 100 parts by weight of wheat flour, wherein the emulsifier (B) is a mixture of glycerin fatty monoester and propylene glycol fatty monoester, and the mixing ratio of glycerin fatty monoester/propylene glycol fatty monoester by weight is 1/0.5 to 1/2.

In the present invention, cake can be made by incorporating 1 to 20 parts by weight of the fat and oil composition for bakery products according to the present invention and sugar (E) into 100 parts by weight of wheat flour. The fat and oil composition for bakery products according to the present invention is incorporated preferably in an amount of 3 to 10 parts by weight relative to 100 parts by weight of wheat flour in order to achieve a sufficient staleness-preventing effect, moist feel and dissolving feel in the mouth and to achieve the prevention of staleness by the emulsifier itself. The sugar is incorporated in an amount of preferably 80 to 300 parts, more preferably 100 to 200 parts by weight, relative to 100 parts by weight of wheat flour, from the viewpoint of dough foaming stability (cake volume) and cake flavor. Preferably, egg is further incorporated as another starting material. The egg is incorporated in an amount of preferably 80 to 300 parts by weight, more preferably 100 to 250 parts by weight, relative to 100 parts by weight of wheat flour, from the viewpoint of dough foaming stability (cake volume) and cake flavor. If necessary, baking powder, water, etc. may be incorporated.

Preferably, the emulsifier (B) is incorporated not only in the form of the fat and oil composition for bakery products according to the present invention but is also added separately for improving foaming properties and foam stability during cake dough production and increasing the cake volume. For exhibiting foaming properties and foam stability more effectively by the emulsifier, the dispersibility of the emulsifier is preferably improved. Accordingly, the emulsifier is used preferably in an emulsified form with sugar, fat and oil. The emulsified state of the emulsifier with sugar and fat and oil is used and generally called a foaming preparation or foamable fat and oil. From the viewpoint of foaming properties and foam stability, it is preferable that the composition of this foamable fat and oil is 5 to 30% by weight of the emulsifier (B), 5 to 40% by weight of sugar, 5 to 30% by weight of fat and oil, and 5 to 40% by weight of water, in the foamable fat and oil.

The cake of the present invention is cake containing 1.8 to 55 parts by weight of (A) fat and oil, 0.33 to 12.8 parts by weight of (B) an emulsifier, 0.001 to 2 parts by weight of (C) a humectant, and 80 to 300 parts by weight of sugar, incorporated into 100 parts by weight of wheat flour, wherein the content of unsaturated fatty acid residues in total fatty acid residues constituting the fat and oil (A) is 75 wt % or more, the (A)/(C) ratio by weight is 6.5 or less, the emulsifier (B) is a mixture of glycerin fatty monoester and propylene glycol fatty monoester, and the mixing ratio of glycerin fatty monoester/propylene glycol fatty monoester by weight is 1/0.5 to 1/2. The amount of the fat and oil (A) is incorporated preferably in an amount of 5 to 40 parts by weight, more preferably 10 to 30 parts by weight, in order to achieve both a moist feel and dissolving feel in the mouth, to improve foaming properties and foam stability during production of cake and to increase the cake volume. From the same viewpoint, the content of unsaturated fatty acid residues in total fatty acid residues constituting the fat and oil (A) is preferably 80 wt % or more. Specific examples of (A) include rape oil, corn oil, soybean oil, palm oil, rice oil, fish oil, etc., among which liquid oil (A') having a melting point of 20° C. or less is preferable. Particularly, the liquid oil is preferably liquid oil having a melting point of 10° C. or less, among which rape-oil, corn oil, soybean oil and rice oil are particularly preferable. Further, diacyl glycerol and middle-chain fatty acid-containing triglyceride and diglyceride can be preferably used insofar as they satisfy the melting-point condition described above.

The cake of the present invention contains the emulsifier (B) in an amount of 0.33 to 12.8 parts by weight, preferably 2 to 10 parts by weight, more preferably 4 to 8 parts by weight, relative to 100 parts by weight of wheat flour in order to achieve both a moist feel and dissolving feel in the mouth, to achieve the prevention of staleness by the emulsifier itself, to improve the foaming properties and foam stability of dough during cake production, and to increase the cake volume. In the cake, the emulsifier (B) is also a mixture consisting of glycerin fatty acid monoester/propylene glycol fatty monoester in a ratio of 1/0.5 to 2.0, preferably in a ratio of almost 1, and the ratio of the fat and oil (A) to the emulsifier (B), that is, the (A)/(B) ratio by weight, is 6.5 or less, preferably 1.7 to 6.5, more preferably 2.0 to 6.5, still more preferably 3.0 to 6.5, in order to achieve a sufficient staleness-preventing effect and both a moist feel and dissolving feel in the mouth.

The cake of the present invention contains the humectant (C) in an amount of 0.001 to 2 parts by weight, preferably 0.05 to 1.0 part by weight, more preferably 0.15 to 0.8 part by weight, still more preferably 0.20 to 0.5 part by weight, relative to 100 parts by weight of wheat flour, in order to achieve a sufficient staleness-preventing effect and both a moist feel and dissolving feel in the mouth.

Supplementary materials include reinforcing agents such as cocoa, coffee, almond powder, concentrated juice, Fleur source, starch, processed starch, dairy products, common salt, a preservative, vitamins, calcium etc., protein, amino acids, a pH adjusting agent, a colorant, a spice, etc.

The process for producing the cake includes a general all-in-mix method, a cold sponge method, a hot sponge method, etc.

In the present invention, the cake includes sponge cake, butter cake, chiffon cake, roll cake, Swiss roll, busse, baumkuchen, pound cake, cheese cake, snack cake, steamed cake, etc. The present invention can also be applied to steamed buns obtained by subjecting dough to heating such as baking, donuts, hot cakes, bean-jam pancakes, and Japanese muffins, any of which fall under the scope of the cakes in the present invention.

The cakes are classified into raw cakes to be consumed within 3 to 4 days and semi-raw cakes to be consumed within 1 to 6 months, and because the latter is stored for a longer time, there is a stronger demand for the staleness-preventing effect and good feel upon eating such as a moist feel and dissolving feel in the mouth, and the present invention is effective for the semi-raw cake.

Because of the longer period prior to consumption of the semi-raw cake, it is preferable that the water content of the cake stored at 20° C. for 1 day after baking is 10 to 25 wt % based on the weight of the cake, and the water activity is 0.85 or less. The water content of the cake referred to in the present invention is determined by drying a previously weighed cake sample in a thermostatic bath at 105° C. for 3 hours, and then measuring its weight again. A value obtained by subtracting the weight of the cake after drying from the weight of the cake before drying is expressed as the water content of the cake in terms of percentage relative to the weight of the cake before drying.

The water activity referred to in the present invention is expressed by using the relative humidity percentage (Aw: 0.00 to 1.00) of air determined after a cake sample is left in a container for a sufficient time (about 30 minutes) until the sample is equilibrated with the air in the container. The water activity is preferably 0.85 or less, more preferably 0.80 or less, in terms of cake storage.

The raw material of the bakery products in the present invention includes not only wheat flour as the main material, but also yeast, yeast food, an emulsifier, fats and oils (shortening, lard, margarine, butter, liquid oil, etc.), water, processed starch, dairy products, common salt, sugars, seasonings (sodium glutamate and nucleic acids), a preservative, a reinforcing agents such as vitamins, calcium, etc., protein, amino acids, chemical expanding agents, flavors, etc. Further, dried fruits such as raisin, wheat flour bran and whole grain powder, which are generally easily aged upon use as the raw material, can be used.

EXAMPLES

Preparation of Fat and Oil Compositions for Bakery Products

The compositions, the compounding (A)/(B) ratios, and the degrees of penetration, of Products A to E of the Invention and Comparative Products a to e as fat and oil compositions for bakery products are shown in Tables 1 and 2. With respect to Comparative Product b, "Commercial vegetable shortening" in the composition, not corresponding to Component (A) below in the present invention, was prepared in place of Component (A).

The method of preparing the fat and oil composition for bakery products is as follows:

1) The components (A) and (B) were weighed in a stainless steel beaker having a volume of 2 liters.

2) The above-mentioned 1) was uniformly dissolved in a water bath at 85° C. and left for 30 minutes.

In this step, agitation was carried out using an anchor hook and a three-one motor (TYPE60G manufactured by HIDON Co., Ltd.).

3) The previously weighed component (C) was added while stirring to the above-mentioned 2), and after it was confirmed that the mixture became uniform, the mixture was left for 30 minutes.

4) In the above-mentioned 3), a large amount of ice was placed in the water bath to cool the mixture to 30° C., and the mixture was kept at a temperature of 30° C. and simultaneously stirred, and then transferred to a predetermined container.

5) The above-mentioned 4) was left overnight (for about 12 hours) in a thermostatic bath at 15° C., and then measured for the degree of penetration and evaluated for bread manufacturing.

In Comparative Example 1 where the edible fat and oil/emulsifier ratio was higher than 6.5, the fat and oil composition had a penetration degree of higher than 200, appeared mobile in the outward appearance and was slightly not uniform with partial separation of liquid oil.

TABLE 1

| Components | Compounded ingredients | Products of the invention (fat and oil composition) | | | | |
|---|---|---|---|---|---|---|
| | | A | B | C | D | E |
| (A) | Purified rape oil(melting point 10° C. or less) | 74.5 | 78.5 | 75.6 | 80.0 | 83.0 |
| | Commercial vegetable shortening (melting point 37° C.) | — | — | — | — | — |
| (B) | Glycerin fatty monoester(Excel T-95: manufactured by KAO Corporation) | 10.0 | 8.0 | 8.0 | 8.0 | 7.0 |
| | Propylene glycolmonobehenic acid ester (PGMB: manufactured by KAO corporation) | 10.0 | 8.0 | 8.0 | 8.0 | 7.0 |
| | Polyglycerin condensed ricinoleic ester (Sun Soft 818SK: manufactured by Taiyo KagakuCo., Ltd.) | 2.0 | 2.0 | 2.0 | 2.0 | — |
| | Soybean lecithin (Nissin Lecithin Dx, manufactured by Nissin Oillio Group, Ltd.) | 1.0 | 1.0 | 1.0 | 1.0 | 0.5 |
| (C) | Xanthane gum (BistopD-3000: Manufactured by San-Ei Gen F.F.I., Inc.) | 2.5 | 2.5 | — | — | 2.5 |
| | Guar gum (Bistop D-20: Manufactured by San-Ei Gen F.F.I., Inc.) | — | — | 5.4 | — | — |
| | Locust bean gum(Bistop D-6: manufactured by San-Ei Gen F.F.I., Inc.) | — | — | — | 1.0 | — |
| | (A)/(B) ratio by weight | 3.2 | 4.1 | 4.0 | 4.2 | 5.7 |
| | Degree of penetration | 31 | 41 | 40 | 61 | 75 |

Purified rape oil: unsaturated fatty acid residues, 93%. Commercial vegetable shortening: unsaturated fatty acid residues, 71%.

The commercial vegetable shortening used was composed of rape oil, hardened rape oil, palm oil, and hardened palm oil.

TABLE 2

| Components | Compounded ingredients | Comparative product (fat an oil composition) | | | | |
|---|---|---|---|---|---|---|
| | | a | b | c | d* | e |
| (A) | Purified rape oil(melting point 10° C. or less) | 85.0 | — | 78.5 | 78.5 | 80.6 |
| | Commercial vegetable shortening (melting point 37° C.) | — | 78.5 | — | — | — |
| (B) | Glycerin fatty monoester (Excel T-95: manufactured by KAO Corp.) | 6.0 | 8.0 | 8.0 | 8.0 | 8.2 |
| | Propylene glycol monobehenic acid ester (PGM, manufactured by Kao Corp.) | 6.0 | 8.0 | 8.0 | 8.0 | 8.2 |
| | Polyglycerin condensed ricinoleic ester (Sun Soft 818SK: manufactured by Taiyo Kagaku Co., Ltd.) | — | 2.0 | 2.0 | 2.0 | 2.0 |
| | Soybean lecithin (Nissin Lecithin Dx: manufactured by Nissin Oillio Group, Ltd.) | 0.5 | 1.0 | 1.0 | 1.0 | 1.0 |
| (C) | Xanthane gum (Bistop D-3000: Manufactured by San-Ei Gen F.F.I., Inc.) | 2.5 | 2.5 | — | 2.5 | — |
| | Guar gum (Bistop D-20: Manufactured by San-Ei Gen F.F.I., Inc.) | — | — | — | — | — |
| | Locust bean gum(Bistop D-6: Manufactured by San-Ei Gen F.F.I., Inc.) | — | — | — | — | — |
| | (A)/(B) ratio by weight | 6.8 | — | 4.1 | — | 4.2 |
| | Degree of penetration | 246 | 15 | 40 | — | 40 |

*Comparative Product d: Without preparing its corresponding fat and oil composition, the respective components were separately added.

Examples 1 to 5, Comparative Examples 1 to 5

Products A to E of the invention, Comparative Products a to d, and a product in Comparative Example 5 into which no fat and oil composition for bakery products was added, were evaluated for bread manufacturing.

Specifically, these products were examined in a composition of white baked bread, that is, easily aged bread. The white baked bread referred to herein is the one baked at low temperatures for a long time such that the crust in the bread became white, and this bread is pleasing owing to its appearance and soft feel upon eating, but has a problem that the crust is not sufficiently formed, and the baking conditions are so mild that gelatinization of starch does not sufficiently proceed, resulting in easy staleness. The bread compositions (composition in intermediate stage, composition in kneading stage) are shown in Table 3.

Intermediate fermentation temperature: 26.5° C.
Intermediate fermentation relative humidity: 80%
Intermediate fermentation time: 2.5 hours
Intermediate fermentation finish temperature: 29.0° C.

2. Conditions for Preparing Dough in the Kneading Stage

The intermediate dough was introduced into a vertical mixer (Kantomixer, 10 coats), and the materials in the kneading stage (materials other than margarine, the fat and oil composition, and xanthane gum) were added and kneaded at low speed for 3 minutes and then at moderate to high speed for 3 minutes, and the remainder materials (margarine, the fat and oil composition, and xanthane gum) were added, kneaded at low speed for 3 minutes, at moderate to high speed for 3 minutes and at high speed for 7 minutes, to make kneaded dough. The kneading temperature of the kneaded dough was 29° C.

For recovery of the dough from damage upon kneading, a floor time of 20 minutes was taken at 27.0° C., and thereafter the dough was divided into portions each weighing 60 g. For eliminating dough damage upon division, a bench time of 20 minutes was taken at 27.0° C., and the dough was molded in a molder. The dough was placed on a heating plate and then fermented. The fermentation conditions are as follows:

TABLE 3

|  |  | Example | | | | | Comparative example | | | | |
| --- | --- | --- | --- | --- | --- | --- | --- | --- | --- | --- | --- |
|  |  | 1 | 2 | 3 | 4 | 5 | 1 | 2 | 3 | 4 | 5 |
| Composition in intermediate stage (parts by weight) | Wheat flour | 70 | 70 | 70 | 70 | 70 | 70 | 70 | 70 | 70 | 70 |
|  | Yeast | 3 | 3 | 3 | 3 | 3 | 3 | 3 | 3 | 3 | 3 |
|  | Sugar | 3 | 3 | 3 | 3 | 3 | 3 | 3 | 3 | 3 | 3 |
|  | Egg | 8 | 8 | 8 | 8 | 8 | 8 | 8 | 8 | 8 | 8 |
|  | Yeast food | 0.1 | 0.1 | 0.1 | 0.1 | 0.1 | 0.1 | 0.1 | 0.1 | 0.1 | 0.1 |
|  | Dreamer soft[*1] | 2 | 2 | 2 | 2 | 2 | 2 | 2 | 2 | 2 | 2 |
|  | Water | 33 | 33 | 33 | 33 | 33 | 33 | 33 | 33 | 33 | 33 |
| Composition in kneading stage (parts by weight) | Wheat flour | 30 | 30 | 30 | 30 | 30 | 30 | 30 | 30 | 30 | 30 |
|  | Liquid sugar[*2] | 5 | 5 | 5 | 5 | 5 | 5 | 5 | 5 | 5 | 5 |
|  | Margarine[*3] | 15 | 20 | 20 | 20 | 20 | 20 | 20 | 20 | 20 | 20 |
|  | Fat and oil composition | A | B | C | D | E | a | b | c | d* | e |
|  | Compounded amount | 5 | 5 | 5 | 5 | 5 | 5 | 5 | 4.875 | 5 | — |
|  | Milk | 15 | 15 | 15 | 15 | 15 | 15 | 15 | 15 | 15 | 15 |
|  | Water | 13 | 13 | 13 | 13 | 13 | 13 | 13 | 13 | 13 | 13 |
|  | Xanthane gum | — | — | — | — | — | — | — | 0.125 | — | — |

*The components in Comparative Example 4 were separately added without preparing the corresponding fat and oil composition. The timing of addition was the same as in the other fat and oil compositions.
Dreamer Soft[*1]: Monoglyceride-containing emulsified fat and oil composition manufactured by Kao Corporation.
Liquid sugar[*2]: MC-45 manufactured by Nippon Shokuhin Kako Co., Ltd.
Margarine[*3]: Cherica Dx manufactured by Kao Corporation.

<Conditions for Producing the White Baked Bread>

1. Conditions for Preparing Dough in the Intermediate Stage

Using a vertical mixer (Kanto mixer, 10 coats) and a hook, the materials in the intermediate stage were introduced into the mixer and kneaded at low speed for 3 minutes and then for 2 minutes at moderate to high speed, and then formed into intermediate dough at a kneading temperature of 25° C. Then, the dough was fermented (intermediate fermentation). The conditions for this fermentation were as follows:

Fermentation temperature: 38° C.
Relative humidity: 80%
Fermentation time: 45 minutes The sample prepared under the conditions described above was baked for 13 minutes in an oven at 170° C. After baking, the sample was cooled to room temperature (20° C.) for 45 minutes, then placed in a vinyl bag, sealed, stored at 20° C. for 3 days and evaluated as a bread sample.

<Sensory Evaluation of Bread>

Monadic evaluation with respect to softness, a moist feel, and dissolving feel in the mouth was carried out by a panel of 10 examiners. The softness is indicative of "staleness-preventing effect".

TABLE 4

|  | Example | | | | | Comparative example | | | | |
| --- | --- | --- | --- | --- | --- | --- | --- | --- | --- | --- |
|  | 1 | 2 | 3 | 4 | 5 | 1 | 2 | 3 | 4 | 5 |
| Softness | ◉ | ◉ | ◉ | ◉ | ◉ | ○ | Δ | ○ | ○ | Δ |
| Moist feel | ◉ | ◉ | ◉ | ◉ | ◉ | ○ | Δ | ○ | ○ | Δ |
| Melting feel in the mouth | ○ | ◉ | ○ | ◉ | ◉ | Δ | X | X | X | Δ |

◉:Judged to be excellent by at least 8 of 10 examiners.
○:Judged to be excellent by 5 to 7 of 10 examiners.
Δ:Judged to be excellent by 3 to 4 of 10 examiners.
X:Judged to be not excellent by at least 8 of 10 examiners.

These results are shown in Table 4

As described above, it was found that the white baked bread produced by adding the fat and oil composition of the present invention is prevented from undergoing staleness, and improves a dissolving feel in the mouth.

Examples 6 to 10, Comparative Examples 6 to 8

As fat and oil compositions, Products A to E of the Invention, Comparative Products b and e, and a product (Comparative Example 8) into which no fat and oil composition was added, were evaluated for bread manufacturing. The evaluated bread compositions (composition in intermediate stage, composition in kneading stage) are shown in Table 5.

TABLE 5

|  |  | Example | | | | | Comparative example | | |
| --- | --- | --- | --- | --- | --- | --- | --- | --- | --- |
|  |  | 1 | 2 | 3 | 4 | 5 | 1 | 2 | 3 |
| Composition in intermediate stage (parts by weight) | Wheat flour | 70 | 70 | 70 | 70 | 70 | 70 | 70 | 70 |
|  | Yeast | 2 | 2 | 2 | 2 | 2 | 2 | 2 | 2 |
|  | Yeast food | 0.1 | 0.1 | 0.1 | 0.1 | 0.1 | 0.1 | 0.1 | 0.1 |
|  | Commercial powdery emulsifier* | 0.3 | 0.3 | 0.3 | 0.3 | 0.3 | 0.3 | 0.3 | 0.3 |
|  | Water | 40 | 40 | 40 | 40 | 40 | 40 | 40 | 40 |
| Composition in kneading stage (parts by weight) | Wheat flour | 30 | 30 | 30 | 30 | 30 | 30 | 30 | 30 |
|  | Sugar | 5 | 5 | 5 | 5 | 5 | 5 | 5 | 5 |
|  | Common salt | 2 | 2 | 2 | 2 | 2 | 2 | 2 | 2 |
|  | Skim milk | 2 | 2 | 2 | 2 | 2 | 2 | 2 | 2 |
|  | Fat and oil composition | 5 | 5 | 5 | 5 | 5 | 5 | 5 | — |
|  | Water | 25 | 25 | 25 | 25 | 25 | 25 | 25 | 25 |
|  | Commercial vegetable shortening (A) | 5 | 5 | 5 | 5 | 5 | 5 | 5 | 5 |

*Emulgy MM-100 manufactured by The Riken Vitamin Co., Ltd.
*Emulgy MM-100 manufactured by The Riken Vitamin Co., Ltd.

<Conditions for Producing Sliced Bread>

1. Conditions for Preparing Dough in the Intermediate Stage

Using a vertical mixer (Kanto mixer, 10 coats) and a hook, the materials in the intermediate stage were introduced into the mixer and kneaded at low speed for 3 minutes and then for 2 minutes at moderate to high speed at a kneading temperature of 23° C., to make intermediate dough. Then, this dough was fermented (intermediate fermentation). The conditions for this fermentation were as follows:
Intermediate fermentation temperature: 26° C.
Intermediate fermentation relative humidity: 80%
Intermediate fermentation time: 4.5 hours
Intermediate fermentation finish temperature: 29.5° C.

2. Conditions for Preparing Dough in the Kneading Stage

The intermediate dough was introduced into a vertical mixer (Kanto mixer, 10 coats), and the materials in the kneading stage (all materials except for the shortening) were added and kneaded at low speed for 3 minutes and then at moderate to high speed for 3 minutes, and then the shortening was added and kneaded at low' speed for 3 minutes, at moderate to low speed for 2 minutes, and at high speed for 2 minutes to make kneaded dough. The kneading temperature of the kneaded dough was 26.5° C.

For recovery of the dough from damage upon kneading, a floor time of 30 minutes was taken at 27.0° C., and thereafter the dough was divided into portions each weighing 230 g. For eliminating dough damage upon division, a bench time of 20 minutes was taken at 27.0° C., and the dough was molded in a molder. The 6 molded products were placed in a square bread frame and fermented. The fermentation conditions are as follows:
Fermentation temperature: 38° C.
Relative humidity: 80% RH
Fermentation time: 50 minutes The bread dough prepared under the conditions described above was baked for 40 minutes in an oven at 210° C. After baking, the sample was cooled for 90 minutes at 20° C., then placed in a vinyl bag, sealed, stored at 20° C. for 3 days, and cut in a thickness of 20 mm with a slicer, to make a bread sample.

In evaluation in the Examples and Comparative Examples, the sliced bread samples were measured for compression stress and evaluated sensorily.

<Sensory Evaluation of Bread>

Sensory evaluation was carried out according to the bread sensory evaluation method and criteria described above. The results are shown in Table 6.

TABLE 6

|  | Example | | | | | Comparative example | | |
| --- | --- | --- | --- | --- | --- | --- | --- | --- |
|  | 1 | 2 | 3 | 4 | 5 | 1 | 2 | 3 |
| Bread compression stress (N) | 1.4 | 1.6 | 1.5 | 1.7 | 1.7 | 2.5 | 2.4 | 2.8 |
| Softness | ◎ | ◎ | ◎ | ◎ | ◎ | △ | ○ | △ |
| Moist feel | ◎ | ◎ | ◎ | ◎ | ◎ | △ | ○ | △ |
| Melting feel in the mouth | ○ | ◎ | ○ | ◎ | ◎ | X | X | △ |

As described above, it was found that the sliced bread of the present invention is prevented from undergoing staleness, and improves a dissolving feel in the mouth.

Examples 11 to 15, Comparative Examples 9 to 11

As fat and oil compositions, Products A to E of the Invention, Comparative Products b and e, and a product (Comparative Example 11) into which no fat and oil composition was added, were evaluated for manufacturing of Danish pastry bread. The evaluated bread compositions are shown in Table 7.

TABLE 7

|  |  | Example | | | | | Comparative example | | |
| --- | --- | --- | --- | --- | --- | --- | --- | --- | --- |
|  |  | 11 | 12 | 13 | 14 | 15 | 9 | 10 | 11 |
| Bread composition (parts by weight) | Wheat flour(bread flour) | 80 | 80 | 80 | 80 | 80 | 80 | 80 | 80 |
|  | Wheat flour (weak flour) | 20 | 20 | 20 | 20 | 20 | 20 | 20 | 20 |
|  | Yeast | 7 | 7 | 7 | 7 | 7 | 7 | 7 | 7 |
|  | Yeast food | 0.05 | 0.05 | 0.05 | 0.05 | 0.05 | 0.05 | 0.05 | 0.05 |
|  | Sugar | 16 | 16 | 16 | 16 | 16 | 16 | 16 | 16 |
|  | Skim milk | 4 | 4 | 4 | 4 | 4 | 4 | 4 | 4 |
|  | Common salt | 1 | 1 | 1 | 1 | 1 | 1 | 1 | 1 |
|  | Whole egg | 20 | 20 | 20 | 20 | 20 | 20 | 20 | 20 |
|  | Shortening | 15 | 15 | 15 | 15 | 15 | 15 | 15 | 15 |
|  | Fat and oil composition | A | B | C | D | E | b | e | — |
|  | Compounded amount | 5 | 5 | 5 | 5 | 5 | 5 | 5 | — |
|  | Water | 40 | 40 | 40 | 40 | 40 | 40 | 40 | 40 |
|  | Roll-in fat and oil | 50 | 50 | 50 | 50 | 50 | 50 | 50 | 50 |

<Conditions for Producing Danish Pastry>
1. Conditions for Production of Dough (Straight Method)

Using a vertical mixer (Kanto mixer, 10 coats) and a hook, the compounded materials other than roll-in fat and oil were introduced into the mixer and kneaded at low speed for 3 minutes, at moderate to high speed for 5 minutes and at high speed for 12 minutes at a kneading temperature of 18° C., to make dough. For recovery of the dough from damage, a floor time of 40 minutes was taken at 27° C., and then the dough was stored for 8 hours in a thermostatic bath at −4° C. The dough was combined with the dough roll-in fat and oil, and folding thereof in three with a seater was carried out 3 times to make layered dough. The dough was divided into portions each weighing 50 g and then fermented. The fermentation conditions are as follows:

Fermentation temperature: 35° C.
Relative humidity: 80% RH
Fermentation time: 30 minutes The bread dough prepared under the conditions described above was baked for 9 minutes in an oven at 210° C. After baking, the sample was cooled for 30 minutes at 20° C., then placed in a vinyl bag, sealed, stored at 20° C. for 3 days, and evaluated as a bread sample.

In evaluation in the Examples and Comparative Examples, sensory evaluation of each bread sample was carried out.
<Sensory Evaluation of Bread>

Sensory evaluation was carried out according to the bread sensory evaluation method and criteria described above. The results are shown in Table 8.

TABLE 8

|  | Example | | | | | Comparative example | | |
| --- | --- | --- | --- | --- | --- | --- | --- | --- |
|  | 11 | 12 | 13 | 14 | 15 | 9 | 10 | 11 |
| Softness | ◎ | ◎ | ◎ | ◎ | ◎ | ○ | △ | X |
| Moist feel | ◎ | ◎ | ◎ | ◎ | ◎ | ○ | △ | X |
| Melting feel in the mouth | ○ | ◎ | ○ | ◎ | ◎ | X | △ | △ |

As described above, it was found that the Danish pastry of the present invention is prevented from undergoing staleness, and improves a dissolving feel in the mouth.

Examples 16 to 20, Comparative Examples 12 to 14

As fat and oil compositions, Products A to E of the Invention, Comparative Products b and e, and a product (Comparative Example 14) into which no fat and oil composition was added, were used to prepare frozen dough and then baked to evaluate bread manufacturing. The evaluated bread compositions are shown in Table 9.

TABLE 9

| | | Example | | | | | Comparative example | | |
|---|---|---|---|---|---|---|---|---|---|
| | | 16 | 17 | 18 | 19 | 20 | 12 | 13 | 14 |
| Frozen dough composition (parts by weight) | Wheat flour(bread flour) | 100 | 100 | 100 | 100 | 100 | 100 | 100 | 100 |
| | Yeast for frozen dough | 6 | 6 | 6 | 6 | 6 | 6 | 6 | 6 |
| | Yeast food for frozen dough | 0.1 | 0.1 | 0.1 | 0.1 | 0.1 | 0.1 | 0.1 | 0.1 |
| | Sugar | 25 | 25 | 25 | 25 | 25 | 25 | 25 | 25 |
| | Skim milk | 2 | 2 | 2 | 2 | 2 | 2 | 2 | 2 |
| | Common salt | 1 | 1 | 1 | 1 | 1 | 1 | 1 | 1 |
| | Whole egg | 5 | 5 | 5 | 5 | 5 | 5 | 5 | 5 |
| | Shortening | 8 | 8 | 8 | 8 | 8 | 8 | 8 | 8 |
| | Fat and oil composition | A | B | C | D | E | b | e | — |
| | Compounded amount | 5 | 5 | 5 | 5 | 5 | 5 | 5 | — |
| | Water | 46 | 46 | 46 | 46 | 46 | 46 | 46 | 46 |

<Conditions for Producing Frozen Dough>

Using a vertical mixer (Kanto mixer, 10 coats) and a hook, wheat flour (bread flour), yeast for frozen dough, yeast food for frozen dough, sugar, common salt, skim milk, whole egg, and water according to the composition shown in Table 9 were introduced into the mixer and kneaded at low speed for 3 minutes and then at moderate to high speed for 3 minutes, and the fat and oil and the fat and oil composition were added, and the mixture was kneaded at low speed for 3 minutes, at moderate to high speed for 2 minutes and at high speed for 2 minutes (kneading temperature 22° C.). Then, the resulting dough was primarily fermented under the following conditions.

Primary fermentation temperature: 27° C.
Primary fermentation relative humidity: 85%
Primary fermentation time: 60 min.
Primary fermentation finish temperature: 29.5° C.

The dough was divided into pieces each weighing 40 g, and for recovery of the dough from damage upon division, a bench time of 20 minutes was taken at 27° C., and thereafter the dough was molded in a molder. The molded dough was cooled rapidly at −30° C., and when the central temperature became −12° C., the dough was transferred to a thermostatic bath at −20° C. and stored (stored for 1 month).

<Conditions for Production of Bread>

The frozen dough stored at −20° C. for 1 month was defrosted at 25° C. for 60 minutes and fermented at a temperature of 35° C. under 80% relative humidity for 50 minutes. The bread dough thus prepared was placed in an oven at 200° C. for 8 minutes. After baking, the dough was cooled at 20° C. for 45 minutes, then placed in a vinyl bag, sealed, stored at 20° C. for 3 days, and evaluated as a bread sample.

<Sensory Evaluation of Bread>

Evaluation was carried out according to the bread sensory evaluation method and criteria described above. The results are shown in Table 10.

TABLE 10

| | Example | | | | | Comparative example | | |
|---|---|---|---|---|---|---|---|---|
| | 16 | 17 | 18 | 19 | 20 | 12 | 13 | 14 |
| Softness | ◎ | ◎ | ◎ | ◎ | ◎ | ○ | △ | X |
| Moist feel | ◎ | ◎ | ◎ | ◎ | ◎ | ○ | △ | X |
| Melting feel in the mouth | ○ | ◎ | ○ | ◎ | ◎ | X | △ | △ |

As described above, it was found that the bread obtained by baking the frozen dough of the present invention is prevented from undergoing staleness, and improves a dissolving feel in the mouth.

Examples 21 to 25, Comparative Examples 15 to 18

As fat and oil compositions, Products A to E of the Invention, Comparative Products a, b and e, and a product (Comparative Example 18) into which no fat and oil composition was added, were used to prepare cakes which were then baked and evaluated sensorily and measured for water content, water activity, and staleness-preventing effect. The evaluated bread compositions (composition in the intermediate stage, composition in the kneading stage) and their results are shown in Table 11.

<Preparation of Cake Dough>

Using a vertical mixer (Kanto mixer, 20 coats) and a wire, the materials other than wheat flour were introduced into the mixer and kneaded at low speed for 0.5 minute and then at high speed for 3 minutes, to incorporate bubbles into the dough. Thereafter, wheat flour was added thereto and agitated at low speed for 0.5 minute and at high speed for 1 to 3 minutes, to make cake dough having a specific gravity of 0.35.

<Cake Baking>

A release paper was placed on a heating plate for baking, and the cake dough placed in a squeezing bag was squeezed in the form of a disk on the heating plate to make cakes each weighing 22 g. The dough squeezed on the heating plate was baked for 12 minutes in an oven (baking temperature, upper flame 190° C./lower flame 170° C.). After baking, the cake was cooled for 20 minutes at room temperature (20° C.), then placed in a vinyl bag, sealed, stored at 20° C. for 1 day and for 1 month, and evaluated as a bread sample.

<Sensory Evaluation of Bread>

Evaluation was carried out according to the bread sensory evaluation method and criteria described above. The results are shown in Table 11.

TABLE 11

| | | Example | | | | | Comparative example | | | |
|---|---|---|---|---|---|---|---|---|---|---|
| | | 1 | 2 | 3 | 4 | 5 | 1 | 2 | 3 | 4 |
| Wheat flour[1] | | 100 | 100 | 100 | 100 | 100 | 100 | 100 | 100 | 100 |
| Sugar[2] | | 100 | 100 | 100 | 100 | 100 | 100 | 100 | 100 | 100 |
| Whole egg | | 150 | 150 | 150 | 150 | 150 | 150 | 150 | 150 | 150 |
| Foamable fat and oil[3] | | 15 | 15 | 15 | 15 | 15 | 15 | 15 | 15 | 15 |
| Salad oil | | 20 | 20 | 20 | 20 | 20 | 20 | 20 | 20 | 20 |
| Fat and oil composition | Fat and oil | (1) | (2) | (3) | (4) | (5) | (6) | (7) | (8) | — |
| | Compounded amount | 10 | 10 | 10 | 10 | 10 | 10 | 10 | 10 | — |
| Baking powder[4] | | 1 | 1 | 1 | 1 | 1 | 1 | 1 | 1 | 1 |
| After 1 day at 20° C. | Water content of cake (%) | 17.2 | 17.0 | 17.0 | 17.1 | 17.0 | 16.9 | 16.8 | 16.9 | 16.7 |
| | Water activity of cake | 0.77 | 0.78 | 0.79 | 0.79 | 0.79 | 0.76 | 0.75 | 0.76 | 0.75 |
| | Softness | ◎ | ◎ | ◎ | ◎ | ◎ | Δ | ○ | ○ | Δ |
| | Moist feel | ◎ | ◎ | ◎ | ◎ | ◎ | Δ | ○ | ○ | Δ |
| | Melting feel in the mouth | ○ | ◎ | ○ | ◎ | ◎ | X | X | X | Δ |
| After 1 month at 20° C. | Water content of cake (%) | 16.3 | 16.1 | 16.0 | 16.1 | 16.1 | 15.8 | 15.9 | 16.0 | 15.8 |
| | Water activity of cake | 0.74 | 0.73 | 0.72 | 0.72 | 0.72 | 0.70 | 0.71 | 0.72 | 0.72 |
| | Softness | ○ | ○ | ○ | ○ | ○ | X | Δ | Δ | X |
| | Moist feel | ○ | ○ | ○ | ○ | ○ | X | Δ | Δ | X |
| | Melting feel in the mouth | ○ | ◎ | ○ | ◎ | ◎ | X | X | X | X |

[1] Wheat flour: "Violet" (manufactured by The Nisshin Flour Milling Co., Ltd.)
[2] Sugar: "Refined white sugar" (manufactured by Dainippon Meiji Seito)
[3] Foamable fat and oil: "Malish Gold" (manufactured by Kao)
[4] Baking powder: "Aikoku Baking Powder, Special, Blue Can" (manufactured by Ohmiya Shokuryo Kogyo)

1) Wheat flour: "Violet" (manufactured by The Nisshin Flour Milling Co., Ltd.)
2) Sugar: "Refined white sugar" (manufactured by Dainippon Meiji Seito)
3) Foamable fat and oil: "Malish Gold" (manufactured by Kao)
4) Baking powder: "Aikoku Baking Powder Special Blue Can" manufactured by Omiya Shokuryo Kogyo)

As described above, it was found that the cake of the present invention is prevented from undergoing staleness, and improves a moist feel and dissolving feel in the mouth.

The invention claimed is:

1. A fat and oil composition, comprising:
   50 to 85 parts by weight of (A) at least one edible fat or oil having a content of unsaturated fatty acid residues in the total constituent fatty acids thereof of 75 wt % or more,
   10 to 35 parts by weight of (B) at least one emulsifier, and
   0.5 to 5.4 parts by weight of (C) at least one humectant, wherein:
   the (A)/(B) ratio by weight is 6.5 or less, and
   at least 80% by weight of said at least one emulsifier (B) is a glycerin fatty monoester and a propylene glycol fatty monoester, and said glycerin fatty monoester and said propylene glycol fatty monoester are present in a weight ratio of 1/0.5 to 1/2,
   wherein said at least one humectant (C) is a thickening polysaccharide selected from the group consisting of xanthane gum, locust bean gum, guar gum, and a mixture thereof.

2. A fat and oil composition according to claim 1, which comprises said at least one emulsifier (B) in an amount of 10 to 30 parts by weight.

3. A fat and oil composition according to claim 1, wherein the degree of penetration into the fat and oil composition is 200 or less.

4. Bread, comprising 1 to 20 parts by weight of a fat and oil composition according to claim 1, 8 to 20 parts by weight of (D) fat and oil having a melting point of 25 to 50° C., and 8 to 30 parts by weight of (E) sugar, incorporated into 100 parts by weight of wheat flour.

5. Bread according to claim 4, wherein the stress of the bread stored at 20° C. for 3 days after baking is 2.8 N or less upon 50% compression in the height direction of a cram portion in the bread.

6. Bread according to claim 4, wherein the bread is sweet bread.

7. Frozen bread dough comprising 1 to 20 parts by weight of a fat and oil composition according to claim 1, incorporated into 100 parts by weight of wheat flour.

8. Frozen bread dough according to claim 7, which further comprises 3 to 30 parts by weight of (F) yeast.

9. Bread obtained by baking the frozen dough according to claim 7.

10. Bread according to claim 9, which comprises 1 to 67 parts by weight of fat and oil, 0.1 to 7 parts by weight of (B) an emulsifier, and 0.001 to 2 parts by weight of (C) a humectant, incorporated into 100 parts by weight of wheat flour, the emulsifier (B) being a mixture of glycerin fatty monoester and propylene glycol fatty monoester, the mixing ratio of glycerin fatty monoester/propylene glycol fatty monoester by weight being 1/0.5 to 1/2.

11. Cake, comprising 1 to 20 parts by weight of a fat and oil composition according to claim 1 and (E) sugar, incorporated into 100 parts by weight of wheat flour.

12. A method of producing bakery, comprising adding a fat and oil composition of claim 1 to dough.

13. A fat and oil composition according to claim 1, which comprises 1 to 5.4 parts by weight of (C) said at least one humectant.

14. Bread, comprising 1 to 20 parts by weight of a fat and oil composition and 0.5 to 8 parts by weight of (D) fat and oil having a melting point of 25 to 50° C., incorporated into 100 parts by weight of wheat flour,
   wherein said fat and oil composition comprises:
   50 to 85 parts by weight of (A) at least one edible fat or oil having a content of unsaturated fatty acid residues in the total constituent fatty acids thereof of 75 wt % or more, 10 to 35 parts by weight of (B) at least one emulsifier, and 0.5 to 5.4 parts by weight of (C) at least one humectant, wherein:

the (A)/(B) ratio by weight is 6.5 or less, and at least 80% by weight of said at least one emulsifier (B) is a glycerin fatty monoester and a propylene glycol fatty monoester, and said glycerin fatty monoester and said propylene glycol fatty monoester are present in a weight ratio of 1/0.5 to 1/2, wherein said at least one humectant (C) is a thickening polysaccharide selected from the group consisting of xanthane gum, locust bean gum, guar gum, and a mixture thereof.

15. Bread according to claim 14, wherein the stress of the bread stored at 20° C. for 3 days after baking is 2.2 N or less upon 50% compression in the thickness direction of the bread.

16. Bread according to claim 14, wherein the bread is sliced bread.

17. Bread, comprising liquid oil, comprising 1 to 25 parts by weight of fat and oil, 0.1 to 7 parts by weight of (B) an emulsifier, and 0.001 to 2 parts by weight of (C) a humectant, incorporated into 100 parts by weight of wheat flour, the emulsifier (B) being a mixture of glycerin fatty monoester and propylene glycol fatty monoester, the mixing ratio of glycerin fatty monoester/propylene glycol fatty monoester by weight being 1/0.5 to 1/2, wherein said at least one humectant (C) is a thickening polysaccharide selected from the group consisting of xanthane gum, locust bean gum, guar gum, and a mixture thereof.

18. Bread, comprising liquid oil, comprising 0.5 to 8 parts by weight of (D) fat and oil having a melting point of 25 to 50° C., 0.5 to 17 parts by weight of (A') liquid oil having a melting point of 20° C. or less, 0.1 to 7 parts by weight of (B) an emulsifier, and 0.001 to 2 parts by weight of (C) a humectant, incorporated into 100 parts by weight of wheat flour, the emulsifier (B) being a mixture of glycerin fatty monoester and propylene glycol fatty monoester, the mixing ratio of glycerin fatty monoester/propylene glycol fatty monoester by weight being 1/0.5 to 1/2, wherein said at least one humectant (C) is a thickening polysaccharide selected from the group consisting of xanthane gum, locust bean gum, guar gum, and a mixture thereof.

19. Bread, comprising liquid oil, comprising 8.5 to 37 parts by weight of fat and oil, 0.1 to 7 parts by weight of (B) an emulsifier, 0.001 to 2 parts by weight of (C) a humectant, and 8 to 30 parts by weight of (E) sugar, incorporated into 100 parts by weight of wheat flour, the emulsifier (B) being a mixture of glycerin fatty monoester and propylene glycol fatty monoester, the mixing ratio of glycerin fatty monoester/propylene glycol fatty monoester by weight being 1/0.5 to 1/2, wherein said at least one humectant (C) is a thickening polysaccharide selected from the group consisting of xanthane gum, locust bean gum, guar gum, and a mixture thereof.

20. Bread, comprising liquid oil, comprising 8 to 20 parts by weight of fat and oil having a melting point of 25 to 50° C., 0.5 to 17 parts by weight of (A') liquid oil having a melting point of 20° C. or less, 0.1 to 7 parts by weight of (B) an emulsifier, 0.001 to 2 parts by weight of (C) a humectant, 8 to 30 parts by weight of (E) sugar, incorporated into 100 parts by weight of wheat flour, the emulsifier (B) being a mixture of glycerin fatty monoester and propylene glycol fatty monoester, the mixing ratio of glycerin fatty monoester/propylene glycol fatty monoester by weight being 1/0.5 to 1/2, wherein said at least one humectant (C) is a thickening polysaccharide selected from the group consisting of xanthane gum, locust bean gum, guar gum, and a mixture thereof.

21. Bread, comprising 1 to 20 parts by weight of a fat and oil composition according to claim 1, 20 to 70 parts by weight of (D) fat and oil having a melting point of 25 to 50° C., and 5 to 30 parts by weight of (E) sugar, incorporated into 100 parts by weight of wheat flour.

22. Bread according to claim 21, wherein the bread is a Danish pastry, brioche or croissant.

23. Bread comprising 20.5 to 87 parts by weight of fat and oil, 0.1 to 7 parts by weight of (B) an emulsifier, 0.001 to 2 parts by weight of (C) a humectant, and 5 to 30 parts by weight of (E) sugar, incorporated into 100 parts by weight of wheat flour, the emulsifier (B) being a mixture of glycerin fatty monoester and propylene glycol fatty monoester, the mixing ratio of glycerin fatty monoester/propylene glycol fatty monoester by weight being 1/0.5 to 1/2, wherein said at least one humectant (C) is a thickening polysaccharide selected from the group consisting of xanthane gum, locust bean gum, guar gum, and a mixture thereof.

24. Cake, comprising 1.8 to 55 parts by weight of fat and oil, 0.33 to 12.8 parts by weight of (B) an emulsifier, 0.001 to 2 parts by weight of (C) a humectant, and 80 to 300 parts by weight of sugar, incorporated into 100 parts by weight of wheat flour, the emulsifier (B) being a mixture of glycerin fatty monoester and propylene glycol fatty monoester, the mixing ratio of glycerin fatty monoester/propylene glycol fatty monoester by weight being 1/0.5 to 1/2, wherein said at least one humectant (C) is a thickening polysaccharide selected from the group consisting of xanthane gum, locust bean gum, guar gum, and a mixture thereof.

25. Cake according to claim 11, wherein the water content of the cake stored at 20° C. for 1 day after baking is 10 to 25 wt % based on the weight of the cake, and the water activity is 0.85 or less.

* * * * *